United States Patent [19]

Weichler

[11] Patent Number: 5,501,137
[45] Date of Patent: Mar. 26, 1996

[54] HYDRAULIC MACHINE-TOOL ACTUATOR WITH POSITION DETECTORS

[75] Inventor: Helmut Weichler, Bachhagel, Germany

[73] Assignee: Gunter Horst Rohm, Sontheim, Germany

[21] Appl. No.: 372,681

[22] Filed: Jan. 17, 1995

[30] Foreign Application Priority Data

Jan. 17, 1994 [DE] Germany .......................... 44 01 423

[51] Int. Cl.$^6$ .................................................. F01B 31/12
[52] U.S. Cl. .................................. 92/5 R; 92/13; 92/54; 279/4.02
[58] Field of Search ............................. 91/1; 92/5 R, 13, 92/13.6, 13.7, 54, 55, 106; 279/4.01, 4.02, 2.06

[56] References Cited

U.S. PATENT DOCUMENTS

| 2,605,748 | 8/1952 | Rasoletti | 92/5 R |
| 4,945,819 | 8/1990 | Rohm | 92/13.6 |

FOREIGN PATENT DOCUMENTS 3049579  7/1982  Germany .................................. 92/5 R

*Primary Examiner*—F. Daniel Lopez
*Attorney, Agent, or Firm*—Herbert Dubno; Andrew Wilford

[57] ABSTRACT

An actuator has a cylinder centered on an axis and a piston axially displaceable in the cylinder, defining therein axially opposite front and rear compartments, and having an axially rearwardly projecting stem. A distributor is axially fixed but rotatable about the axis on the stem offset from the cylinder. The piston and distributor are formed with passages for pressurizing and depressurizing the compartments. At least one control element is fixed on the distributor offset from the cylinder. A sleeve coaxially surrounds the piston stem and forms a rear abutment against which the piston engages in a rearmost position of the piston. Formations on the cylinder and on the sleeve can axially displace the sleeve on the cylinder and fix the sleeve on the cylinder in any of a multiplicity of axially offset positions thereon. Respective front and rear control members extending axially rearward from front and rear bearings on the cylinder and sleeve are engageable with the control element to operate same.

10 Claims, 3 Drawing Sheets

HYDRAULIC MACHINE-TOOL ACTUATOR WITH POSITION DETECTORS

SPECIFICATION

FIELD OF THE INVENTION

The present invention relates to a hydraulic machine-tool actuator. More particularly this invention concerns such an actuator adapted to operate a power chuck or mandrel and provided with a system for detecting when it is in its end positions.

BACKGROUND OF THE INVENTION

A standard power actuator for a chuck, mandrel, or like machine tool adapted to hold a tool or a workpiece that is being machined typically has a hollow cylinder generally centered on an axis and normally fixed to, for instance, the chuck body, and a piston axially displaceable but nonrotatable in the cylinder, defining therein a pair of axially opposite pressurizable compartments, and normally fixed, for instance, to the jaw-actuating member of the chuck. A piston stem centered on the axis, fixed to the piston, and extending axially from the piston is formed with a pair of separate feed passages each having one end opening into a respective compartment and an opposite end opening axially on the stem. A distributor body rotatable about the axis on the stem at the opposite ends of the passages is provided with respective connections communicating with the opposite passage ends so that the compartments can be pressurized via the respective passages, thereby moving the jaws on the chuck body. Structure on the stem and distributor body permits the body to rotate about the axis on the stem but prevents the body from moving axially on the stem.

In order to use such an actuator in an automated machining system it is necessary to provide a position-monitoring unit that itself is connected to a controller that in turn operates the valves that themselves control the actuator. This is typically done by providing on the cylinder housing a bearing that is connected to an outrigger that carries a switch- or sensor-actuating member that can coact with a switch or sensor carried on the distributor body that itself is fixed axially but not rotationally on the piston stem. Thus this actuating member is axially but not rotationally fixed on the cylinder housing so that as the cylinder housing and piston move axially relative to each other the actuating member will move past the switch/sensor. The relative positions of the switch/sensor and the actuating member can be set such that, for instance, the switch/sensor is actuated when the chuck is fully opened or closed.

In U.S. Pat. No. 4,945,819 a threaded ring is provided on a threaded extension of the cylinder and stops carried on this ring extend through seals into the rear compartment where they act as abutments defining the rear end position of the piston. This is useful to limit the rearward stroke in automatic machining operations so that the chuck can be reloaded with limited wasted movement, that is without having to be opened all the way up if that is not necessary. The disadvantage of this system is, however, that on such readjustment it is necessary to also reset the element that trips the switch or valve that is actuated when the piston reaches its rear end position. Furthermore the abutment pins provide a ready route for leakage from the rear compartment.

OBJECTS OF THE INVENTION

It is therefore an object of the present invention to provide an improved hydraulic actuator.

Another object is the provision of such an improved hydraulic actuator which overcomes the above-given disadvantages, that is which is easy to adjust and simple in construction.

SUMMARY OF THE INVENTION

An actuator has a cylinder centered on an axis and a piston axially displaceable in the cylinder, defining therein axially opposite front and rear compartments, and having an axially rearwardly projecting stem. A distributor is axially fixed but rotatable about the axis on the stem offset from the cylinder. The piston and distributor are formed with passages for pressurizing and depressurizing the compartments. At least one control element is fixed on the distributor offset from the cylinder. A sleeve coaxially surrounds the piston stem and forms a rear abutment against which the piston engages in a rearmost position of the piston. Formations on the cylinder and on the sleeve can axially displace the sleeve on the cylinder and fix the sleeve on the cylinder in any of a multiplicity of axially offset positions thereon. Respective front and rear control members extending axially rearward from front and rear bearings on the cylinder and sleeve are engageable with the control element to operate same.

Thus with this system when the rear end position of the piston is changed by adjustment of the sleeve, the respective rear-position cam carried on the rear member is automatically also moved. Since it is this rear position which is normally adjusted when the workpiece is changed, the chuck can be reset in a single simple operation.

According to the invention the formations are interengaging screwthreads on the sleeve and cylinder. The adjustment unit further includes a lock nut threaded on the sleeve and axially engageable with the cylinder. The piston has an axially rearwardly directed annular surface engageable with the abutment of the sleeve and the sleeve has a rear end provided with a collar carrying the rear bearing. The rear control member has a front end fixed axially to an outer race of the rear bearing and a rear end engageable with the control element.

In accordance with further features of the invention the distributor is formed with an axially extending front-member guide in which the front control member is axially slidable. The front control member is formed with an axially extending rear-member guide in which the rear control member is axially slidable. The front control member and the front-member guide are wide and of rectangular cross section and the rear control member and the rear-member guide are of generally circular section. Normally the control element is a switch and each control member carrying a respective cam engageable with the switch. Two such control elements may be provided, each engageable with a respective one of the control members.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
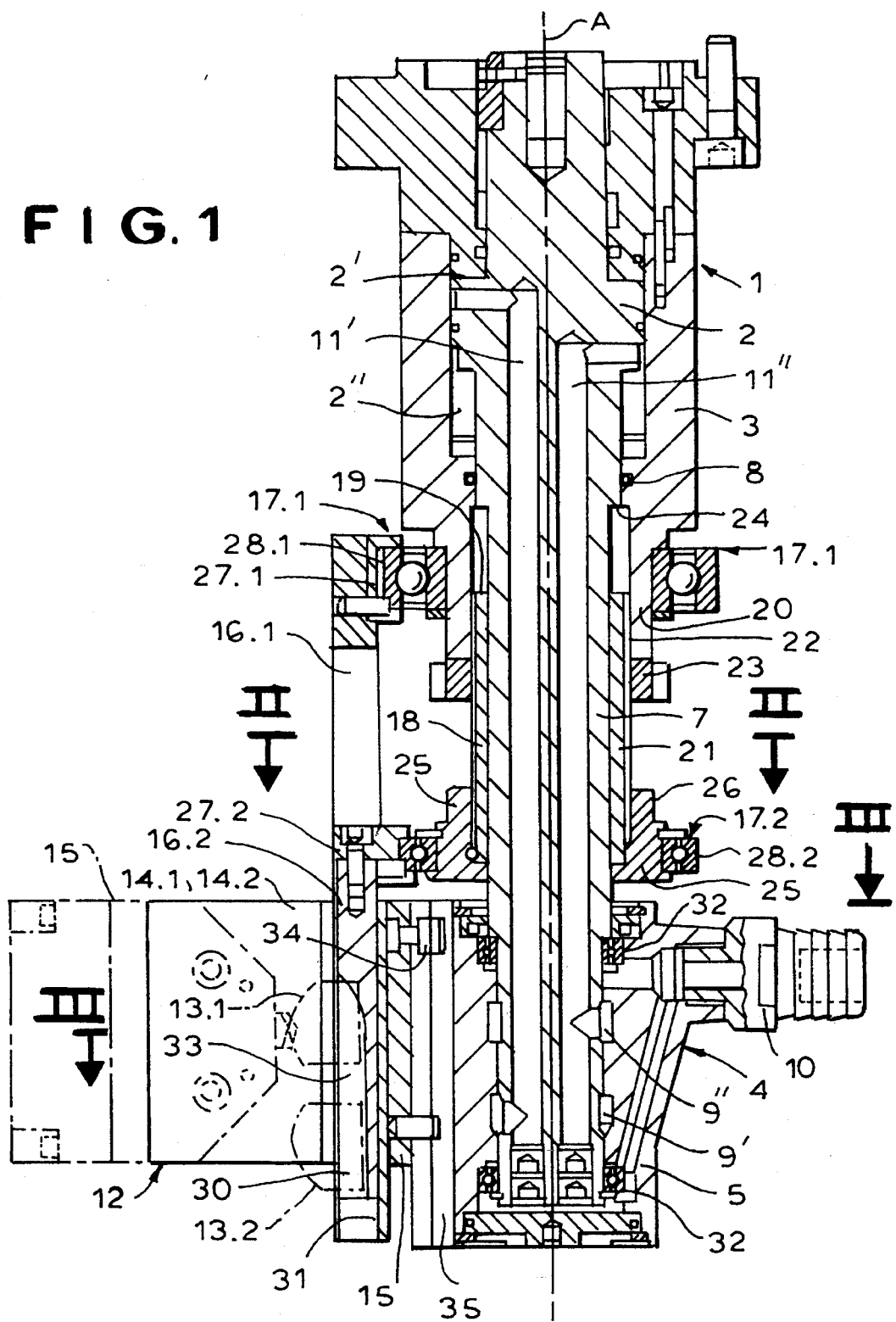
FIG. 1 is a partly diagrammatic axial section through the actuator of this invention.
Figure 2:
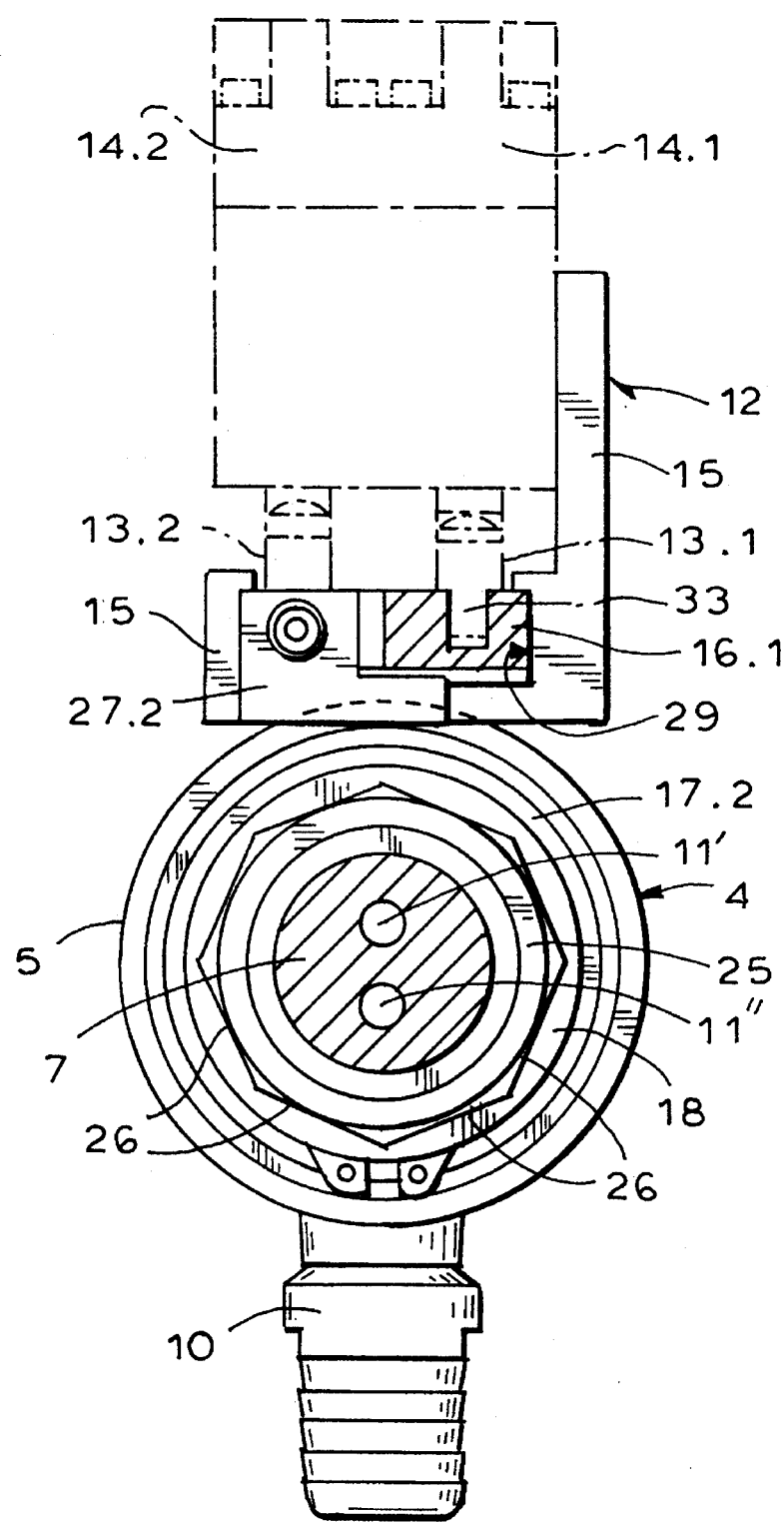
FIGS. 2 and 3 are cross sections taken along respective line II—II and III—III of FIG. 1.

As seen in the drawing an actuator 1 is centered on an axis A and has a piston 2 axially slidably supported at 8 in a cylinder 3 and forming therein front and back compartments 2' and 2". The piston 2 has an axially backwardly extending stem 7 carrying a housing 5 of a distributor 4 that can rotate on the stem 7 via bearings 32 which axially fix it on this stem 7. The housing 5 is normally prevented from rotating and is connected via flexible hoses to a pressure source so it can move axially with the piston 2. Passages 11' and 11" have front ends opening into the respective compartments 2' and 2" and rear ends opening at respective grooves 9' and 9" formed in the housing 5 and associated with respective connections one of which is shown at 6 in FIG. 3. As is well known in the art, it is possible to pressurize and depressurize the compartments 2' and 2" via the passages 11' and 11" to move the piston 2 axially forward or backward in the cylinder 3. Normally a chuck body or the like is bolted to the front end of the cylinder 3 and a jaw-actuating member is connected to the piston 2. Hydraulic fluid or oil that leaks past the grooves 9 is trapped and led away via a fitting 10. This structure is all standard.

A controller 12 having a housing 15 fixed on the distributor housing 5 holds a pair of valves or switches 14.1 and 14.2 that coact with respective actuator elements 13.1 and 13.2 in turn carried on respective axially extending outriggers 16.1 and 16.2 respectively connected to the cylinder 3 and piston 2. The controller housing 15 can be secured by elements 34 in an axially extending T-slot 35 formed in the distributor housing 5.

The cylinder 3 has a rearwardly projecting axially centered collar 20 carrying a front bearing 17.1 whose outer race 28.1 carries a holder to which is fixed the front end of the outrigger 16.1 that is formed as a flat rectangular-section bar extending parallel to the axis A. The housing 15 is formed with a rectangular-section guide slot 29 in which the outrigger bar 16.1 can slide and this bar 16.1 is formed with a laterally open slot 33 in which is mounted the respective switch actuator 13.1.

Figure 3:
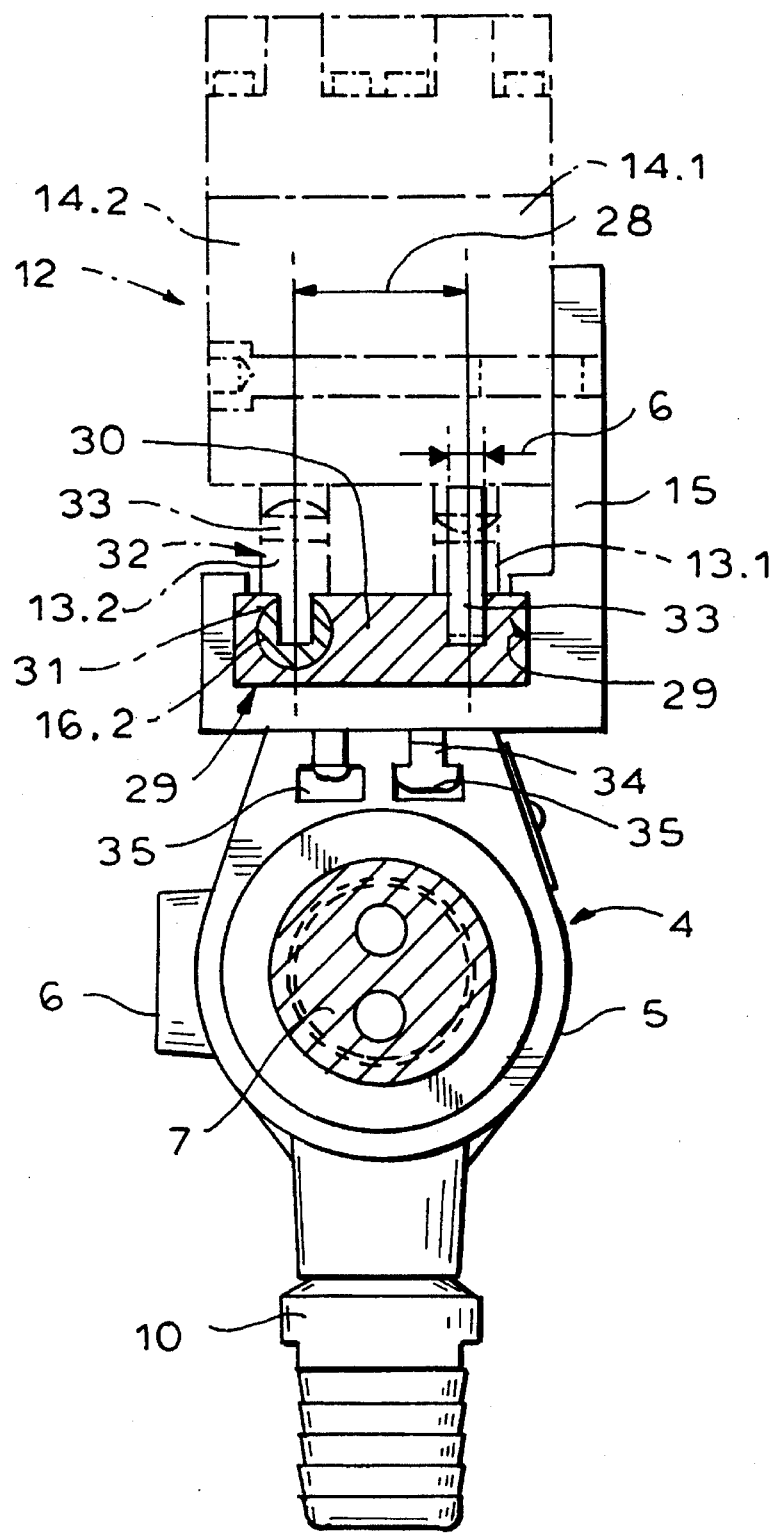

The extension 20 of the cylinder 3 is formed with an internal screwthread 22 in which is threaded an internal screwthread 21 of a cylindrical abutment sleeve 18 whose rear end carries a fitting 25 on which is mounted a bearing 17.2 having an outer race 28.2 connected to another holder 27.2 to which the front end of the outrigger 16.2 is fixed. This outrigger 16.2 is as best seen in FIG. 3 of cylindrical shape and is received in an axially extending guide 31 in the outrigger bar 16.1. In addition the outrigger 16.2 is formed with a slot 30 in which is mounted the respective switch actuator 13.2. Unillustrated means allow the actuators 13.1 and 13.2 to be secured at any of a multitude of axially offset positions in the respective slots 33 and 30.

The sleeve 18 has a front abutment end 19 that can engage a rear abutment surface 24 of the piston 2. In addition a locking nut 23 can fix the sleeve 18 in place in the cylinder 3 and this sleeve 18 has tool-engaging flats 26 in a hexagonal shape so a tool can be fitted to it. Thus the axial position of the sleeve 18 can easily be varied and fixed, thereby simultaneously setting the axial position for the rear end of the piston stroke and the axial position of the rear actuator element 13.2.

While in the illustrated embodiment the switches 14.1 and 14.2 are axially movable and the respective actuators 13.1 and 13.2 are axially fixed, an opposite orientation would be possible. It is also possible for a single switch to take the place of both switches 14.1 and 14.2, that is acted on by both actuators 13.1 and 13.2

I claim:

1. An actuator comprising:

a cylinder centered on an axis;

a piston axially displaceable in the cylinder, defining therein axially opposite front and rear compartments, and having an axially rearwardly projecting stem;

a distributor axially fixed but rotatable about the axis on the stem offset from the cylinder, the piston and distributor being formed with passages for pressurizing and depressurizing the compartments;

at least one control element fixed on the distributor offset from the cylinder;

a sleeve coaxially surrounding the piston stem and forming a rear abutment against which the piston engages in a rearmost position of the piston;

adjustment means including formations on the cylinder and on the sleeve for axially displacing the sleeve on the cylinder and for fixing the sleeve on the cylinder at any of a multiplicity of axially offset positions thereon;

respective front and rear bearings on the cylinder and on the sleeve; and respective front and rear control members extending axially rearward from the front and rear bearing and engageable with the control element to operate same.

2. The actuator defined in claim 1 wherein the formations are interengaging screwthreads on the sleeve and cylinder, the adjustment means including a lock-nut threaded on the sleeve and axially engageable with the cylinder.

3. The actuator defined in claim 1 wherein the piston has an axially rearwardly directed annular surface engageable with the abutment of the sleeve.

4. The actuator defined in claim 1 wherein the sleeve has a rear end provided with a collar carrying the rear bearing.

5. The actuator defined in claim 4 wherein the rear control member has a front end fixed axially to an outer race of the rear bearing and a rear end engageable with the control element.

6. The actuator defined in claim 1 wherein the distributor is formed with an axially extending front-member guide in which the front control member is axially slidable, the front control member being formed with an axially extending rear-member guide in which the rear control member is axially slidable.

7. The actuator defined in claim 6 wherein the front control member and the front-member guide are wide and of rectangular cross section and the rear control member and the rear-member guide are of generally circular section.

8. The actuator defined in claim 1 wherein the control element is a switch, each control member carrying a respective cam engageable with the switch.

9. The actuator defined in claim 1 wherein there are two such control elements each engageable with a respective one of the control members.

10. The actuator defined in claim 1 wherein the front bearing has an inner race fixed on the cylinder and an outer race fixed on the front control member and the rear bearing has an inner race fixed on the sleeve and an outer race fixed on the rear control member.

* * * * *